United States Patent
Katoh et al.

(10) Patent No.: US 6,526,107 B1
(45) Date of Patent: Feb. 25, 2003

(54) SYNCHRONIZATION ACQUIRING CIRCUIT

(75) Inventors: Hisakazu Katoh, Tokyo (JP); Akinori Hashimoto, Tokyo (JP); Kenichi Shiraishi, Yokohama (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/530,962

(22) PCT Filed: Nov. 19, 1998

(86) PCT No.: PCT/JP98/05198

§ 371 (c)(1),
(2), (4) Date: Jul. 12, 2000

(87) PCT Pub. No.: WO99/26386

PCT Pub. Date: May 27, 1999

(30) Foreign Application Priority Data

| Nov. 19, 1997 | (JP) | 9-333745 |
| Nov. 9, 1998 | (JP) | 10-331919 |

(51) Int. Cl.[7] .............. H04L 7/00; H03D 3/24; H04J 11/00

(52) U.S. Cl. ............ 375/368; 375/261; 370/203; 370/206

(58) Field of Search ............... 375/368, 261; 370/206, 203

(56) References Cited

U.S. PATENT DOCUMENTS

| 5,073,906 A | | 12/1991 | Otani et al. | |
| 5,363,375 A | * | 11/1994 | Chuang et al. | 370/95.3 |
| 5,483,686 A | * | 1/1996 | Saka et al. | 455/182.2 |
| 5,555,275 A | * | 9/1996 | Oshima | 375/261 |
| 5,646,935 A | * | 7/1997 | Ishikawa et al. | 370/207 |
| 5,809,009 A | * | 9/1998 | Matsuoka et al. | 370/206 |
| 5,886,999 A | * | 3/1999 | Kojima et al. | 371/5.5 |
| 6,023,491 A | * | 2/2000 | Saka et al. | 375/326 |

FOREIGN PATENT DOCUMENTS

| JP | 1-309431 | 12/1989 |
| JP | 3-179838 | 8/1991 |
| JP | 05-276152 | 10/1993 |
| JP | 5-327688 | 12/1993 |
| JP | 05-327688 | 12/1993 |
| JP | 07-240906 | 9/1995 |
| JP | 9-83590 | 3/1997 |
| JP | 9-186730 | 7/1997 |

OTHER PUBLICATIONS

English Translations of Portions of the Cited Documents Related with the Claims 1 to 3 of the U.S. Patent Application.
Search Report, Japanese Patent Office, Feb. 23, 1999.

* cited by examiner

*Primary Examiner*—Chi Pham
*Assistant Examiner*—Tony Al-Beshrawi
(74) *Attorney, Agent, or Firm*—Eric J. Robinson; Robinson Intellectual Property Law Office, P.C.

(57) ABSTRACT

There is provided a synchronization acquiring circuit for stably acquiring frame synchronization without pseudo-synchronization lock when the frame synchronization is acquired in reception at the time of a low C/N. The synchronization pattern of a received frame is detected by a frame synchronization detecting circuit 2. The bits of the synchronization pattern of the received frame are compared with those of a frame synchronization pattern on the transmitting side by a frame synchronizing circuit 5 to obtain the number of coincided bits. The frame synchronization is regarded as detected when the obtained number of bits of each frame is equal to or larger than the correlation detection value.

7 Claims, 12 Drawing Sheets

SYNCHRONIZATION ACQUIRING CIRCUIT

TECHNICAL FIELD

The present invention relates to a synchronization acquiring circuit, and more specifically relates to a synchronization acquiring circuit used for a receiver to receive a digital modulated signal whose necessary C/N (carrier-power-to-noise power ratio) is transmitted according to a plurality of different modulation systems, for example.

BACKGROUND ART

A hierarchical transmission system in which digital modulated signals whose necessary C/N is transmitted according to a plurality of different modulation systems, for example, 8PSK modulation, QPSK modulation and BPSK modulation are combined in a certain time unit and repeatedly transmitted for each frame is known. Here, the part of a modulated signal corresponding to the least number of levels of the modulated signal used in the transmission signal means the part with fewer phases and more specifically corresponds to the BPSK modulation part. A broadcasting receiver that receives a digital modulated signal according to such a hierarchical transmission system is equipped with a synchronization acquiring circuit that acquires synchronization by detecting a frame synchronization pattern from the demodulated baseband signal (hereinafter, the baseband signal is also referred to as "symbol stream") and detecting coincidence with a predetermined synchronization pattern and its periodicity, and the synchronization is regarded as established when coincidence is detected consecutively at predetermined times.

In this case, assume that a frame synchronization pattern is regarded as detected when a reception frame synchronization pattern completely coincides with the predetermined transmission frame synchronization pattern and its period also coincides. Then, if the C/N is approximately 0 dB, the bit error rate (BER) of a BPSK modulation signal is on the order of the (−1)st power of 1×10, and therefore errors of approximately 2 bits frequently occur in the reception frame synchronization pattern made up of 20 symbols, and thereby there is a problem of making it difficult to detect coincidence between the reception frame synchronization pattern and the predetermined transmission frame synchronization pattern.

Moreover, even if it is not possible to reproduce a carrier in a burst-like manner from the BPSK modulating section (including the burst symbol signal which will be described later), for example, because of the configuration of the hierarchical transmission system in which the frame synchronization pattern is formed at the start of a frame, there may be cases where there are carrier error frequencies at which frame synchronization patterns in demodulated data are detected and these are erroneously detected as frame synchronization. This results in a problem that synchronization is erroneously regarded as established although the carrier is not reproduced.

It is an objective of the present invention to provide a synchronization acquiring circuit for stably acquiring frame synchronization without any pseudo-synchronization lock during reception at a low C/N.

DISCLOSURE OF THE INVENTION

The synchronization acquiring circuit according to the present invention comprises:

synchronization detection means for detecting a reception frame synchronization pattern from a demodulated baseband signal;

C/N determining means for determining a C/N value of a transmission path from the demodulated baseband signal;

correlation detection reference value calculating means for outputting as a correlation detection reference value the number of bits in the reception frame synchronization pattern that coincides with those of a frame synchronization pattern on a transmitting side that can detect and maintain synchronization based on the determined C/N value;

coincided bit number calculation means for comparing the bits of the reception frame synchronization pattern detected by the synchronization detecting means with those of the frame synchronization pattern on the transmitting side and for determining the number of coincided bits;

comparison means for outputting a frame synchronization pattern detection signal when the number of bits determined by the coincided bit number calculation section is equal to or larger than the correlation detection reference value;

first detection means for detecting that a frame synchronization pattern detection signal by the comparison means is output for every one frame period; and second detection means for detecting that a signal, which is received by using a part of a predetermined modulated wave of modulated means used in a transmission signal, has a quality equal to or higher than a predetermined quality, wherein synchronization is regarded as established when the first detection means detects frame synchronization and the second detection means detects that the reception signal has at least a certain quality.

In the synchronization acquiring circuit according to the present invention, the C/N determining means determines the C/N value of a transmission path and a correlation detection reference value is changed on the basis of the determined C/N value. On the other hand, the synchronization pattern of a received frame is detected by the synchronization detection means. The bits of the synchronization pattern of the received frame are compared with those of a frame synchronization pattern on the transmitting side by the coincided bit number calculating means to determine the number of coincided bits. The frame synchronization is regarded as detected when the determined number of bits is equal to or larger than the correlation detection reference value. When the first detection means detects frame synchronization for every one-frame period and the second detection means detects that the signal received by using the predetermined modulated signal part of the modulation signal used in the transmission signal has at least a predetermined quality, synchronization is regarded as established.

Therefore, in the synchronization acquiring circuit according to the present invention, a correlation detection reference value is changed on the basis of the reception condition, the bits of the synchronization pattern of the received frame are compared with the corresponding bits of a frame synchronization pattern on the transmitting side to determine the number of coincided bits, the frame synchronization is regarded as detected when the determined number of bits is equal to or larger than the changed correlation detection reference value, and the corresponding synchronization is detected for every frame period, and synchronization is regarded as established when it is detected that the signal received by using the predetermined modulated signal part of the modulation signal used in the transmission signal has at least a predetermined quality, and therefore it is possible to detect and maintain synchronization even at a low C/N for stably acquiring synchronization.

EMBODIMENT OF THE INVENTION

An embodiment of the synchronization acquiring circuit of the present invention will be explained below.

Figure 1:
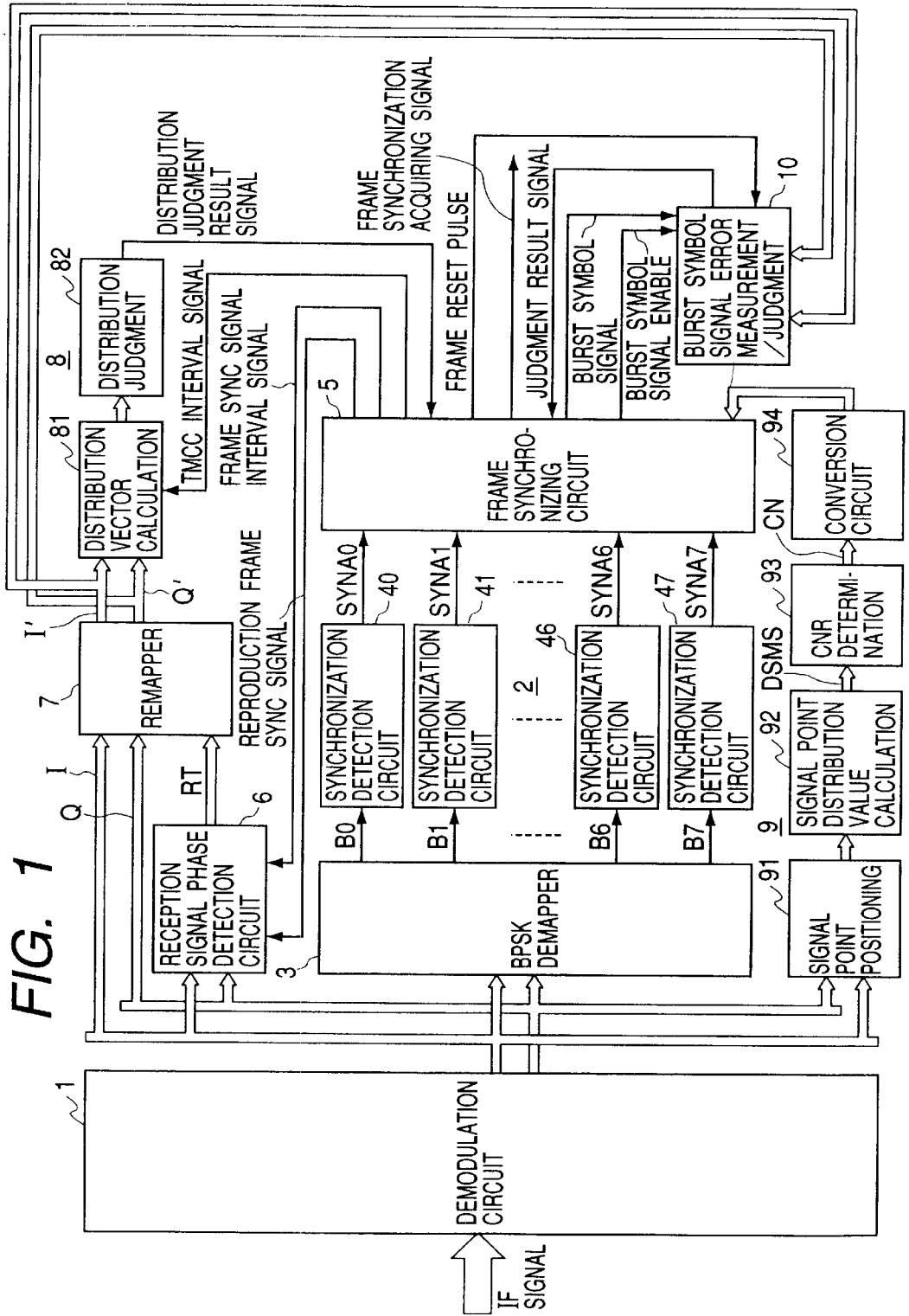
FIG. 1 is a block diagram showing a configuration of a synchronization acquiring circuit according to an embodiment of the present invention.

FIG. 1 is a block diagram showing a configuration of the synchronization acquiring circuit according to an embodiment of the present invention.

The synchronization acquiring circuit according to an embodiment of the present invention comprises a demodulation circuit 1, a frame synchronization detection circuit 2, a frame synchronizing circuit 5, a reception signal phase detection circuit 6, a remapper 7 made up of ROM, a reception signal phase vector distribution judging circuit 8, a C/N determining circuit 9 and a burst symbol signal error measurement/judgment circuit 10.

The frame synchronization detection circuit 2 comprises the BPSK demapper 3 that converts the demodulated output from the demodulation circuit 1 to signal point positioning on the I-Q vector plane on a transmitting side and synchronization detection circuits 40 to 47 that receive the signal converted by the BPSK demapper 3 and detect frame synchronization. The frame synchronizing circuit 5 receives synchronization detection signals output from the frame synchronization detection circuits 40 to 47 and transmits a frame synchronization acquiring signal, etc.

Figure 2:
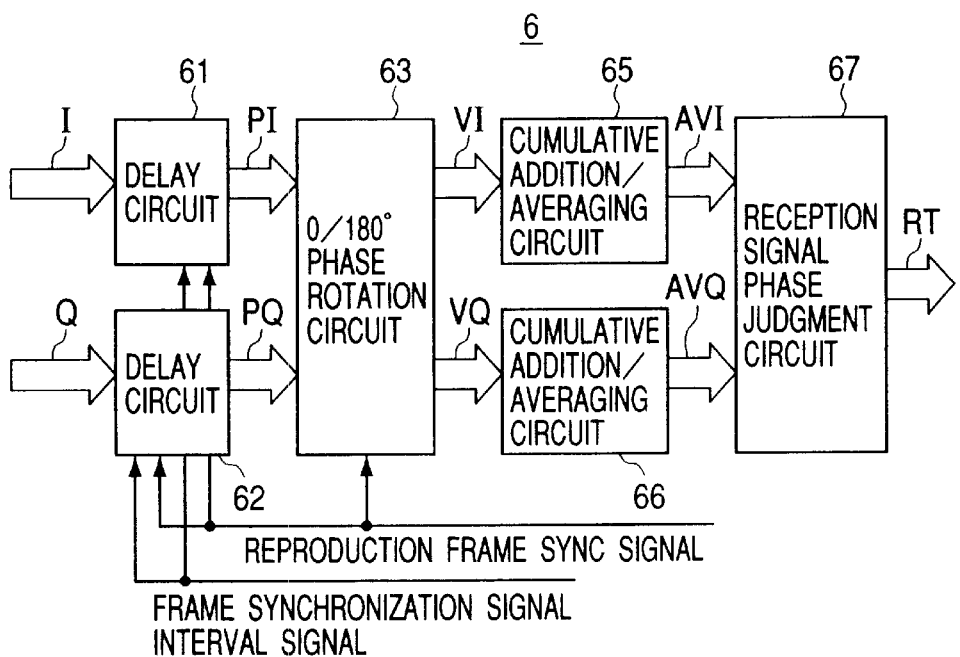
FIG. 2 is a block diagram showing a configuration of a reception signal phase detection circuit of the synchronization acquiring circuit according to the embodiment of the present invention.

The reception signal phase detection circuit 6 comprises, as shown in FIG. 2, delay circuits 61 and 62 that select a frame synchronization pattern interval in the demodulated output from the demodulation circuit 1 and adjust timing, a 0°/180° phase rotating circuit 63 that selectively rotates the phase of the outputs from the delay circuits 61 and 62, cumulative addition/averaging circuits 65 and 66 that find a cumulative addition of the output from the 0°/180° phase rotating circuit 63 to find an average value and a reception signal phase determining circuit 67 that receives the output signals from the cumulative addition/averaging circuits 65 and 66 and that, determines the phases of the reception signals and transmits a phase detection signal.

The remapper 7 receives a demodulation baseband signal output from the demodulation circuit 1 and a phase detection signal output from the reception phase detection circuit 6, determines the current reception signal phase rotation angle from the signal point positioning, performs inverse phase rotation on the demodulated baseband signal based on the reception signal phase rotation angle determined, converts its phase to an absolute phase to coincide with the transmission signal phase angle and sends the absolute phase demodulated output to the reception signal phase vector distribution judging circuit 8 or the burst symbol signal error measurement/judgment circuit 10.

The reception phase vector distribution judging circuit 8 comprises a distribution vector calculating circuit 81 that calculates a distribution vector of the symbol forming a TMCC interval that will be described later from the absolute phase demodulated output and a distribution judging circuit 82 that judges the distribution from the distribution vector calculated by the distribution vector calculating circuit 81, and sends the distribution vector distribution judgment result signal to the frame synchronizing circuit 5.

The C/N determining circuit 9 comprises a signal point positioning conversion circuit 91 that receives the demodulated baseband signal output from the demodulation circuit 1 and converts it to signal point positioning, a signal point distribution value calculating circuit 92 that calculates the distribution value of signal point positioning converted by the signal point positioning conversion circuit 91, a CNR determining circuit 93 that determines a C/N value from the signal based on the distribution value calculated by the signal point distribution value calculating circuit 92 and a conversion circuit 94 that determines a correlation detection reference value that becomes a reference for detecting a frame synchronization pattern corresponding to the C/N value determined by the CNR determining circuit 93 from a BER characteristic, and the C/N determining circuit sends the correlation detection reference value which is the conversion output from the conversion circuit 94 to the frame synchronizing circuit 5.

The burst symbol signal error measurement/judgment circuit 10 receives the absolute phase demodulated output, which is the output of the burst symbol signal and the remapper 7, and sends a judgment result signal as to whether a distribution vector of the burst symbol signal is normal or not to the frame synchronizing circuit 5. The judgment method for the distribution vector of the burst symbol signal is the same as the calculation/judgment method of a distribution vector of a TMCC (described later), for example. Furthermore, if the burst symbol signal is fixed data repeated for every frame, synchronization can be easily determined by measuring the error rate and comparing it with a predetermined reference value.

Figure 3:
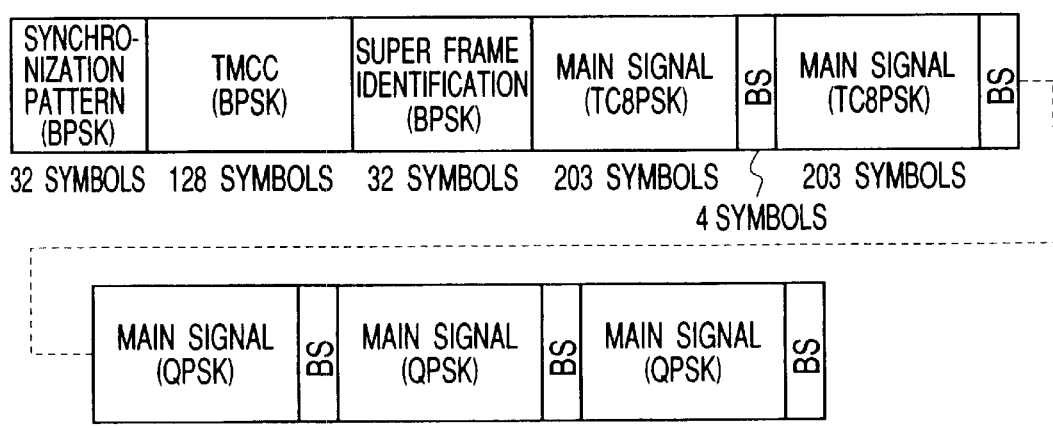
FIG. 3 is a schematic diagram showing an example of a frame configuration of a hierarchical transmission system.

Here, the frame configuration according to the hierarchical transmission system is explained. FIG. 3 is a diagram showing a frame configuration example according to the hierarchical transmission system. One frame consists of 39936 symbols formed by a plurality of pairs of 203 symbols and 4 symbols.

More specifically, one frame is formed in the following order: 32 symbols of frame synchronization pattern (BPSK) (only the last 20 symbols of the 32 symbols can be used as a frame synchronization pattern), 128 symbols of TMCC (Transmission and Multiplexing Configuration Control) pattern (BPSK) for identification of transmission multiplexing configuration, 32 symbols of super frame identification information pattern (the last 20 symbols of the 32 symbols are accurate identification information), 203 symbols of main signal (TC8PSK), 4 symbols of burst symbol signal (described as "BS" in FIG. 3) BPSK-modulated by pseudo-random noise (PN) signal set for every one frame period, 203 symbols of main signal (TC8PSK), 4 symbols of burst symbol signal, . . . , 203 symbols of main signal (QPSK), and 4 symbols of burst symbol signal, 203 symbols of main signal (QPSK) and 4 symbols of burst symbol signal. Here, 8 frames are called a "super frame" and the super frame identification information pattern is information for super frame identification. The 192 symbols from a frame synchronization pattern to the end of a super frame identification information pattern are also referred to as "header 7."

The synchronization acquiring circuit according to an embodiment of the present invention converts the frequency of the received digital modulated signal to a predetermined intermediate frequency, supplies the frequency-converted intermediate frequency (IF) signal to the demodulation circuit 1 for demodulation and sends, for example, demodulated baseband signals with 8 quantized bits I(8) and Q(8) (numbers in parentheses represent the number of bits and hereafter they are simply described as I and Q, omitting the number of bits) from the demodulation circuit 1.

Baseband signals I(8) and Q(8) acquire BPSK-modulated frame synchronization patterns, and therefore, they are input to the BPSK demapper 3 of the frame synchronization detection circuit 2 and BPSK-demapped bit streams B0, B1, . . . , B7 are output from the BPSK demapper 3. The BPSK demapper 3 is made up of ROM, for example.

Figure 5A:
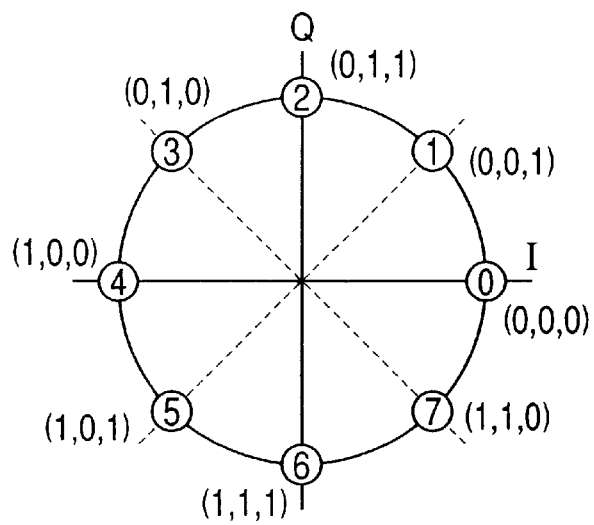
FIGS. 5(a) and 5(b) and 5(c) are a schematic diagram showing a mapping for each modulation system on the transmitting side according to the embodiment of the present invention.
Figure 5B:
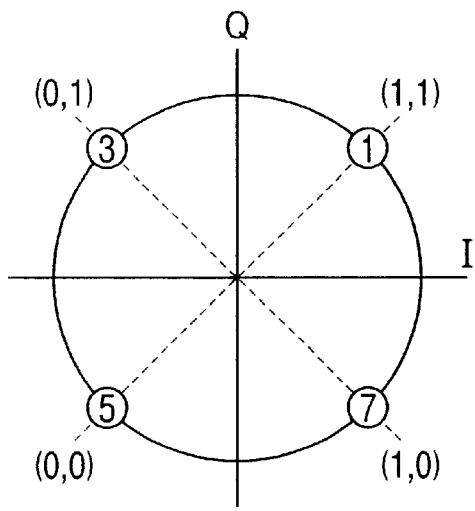
Figure 5C:
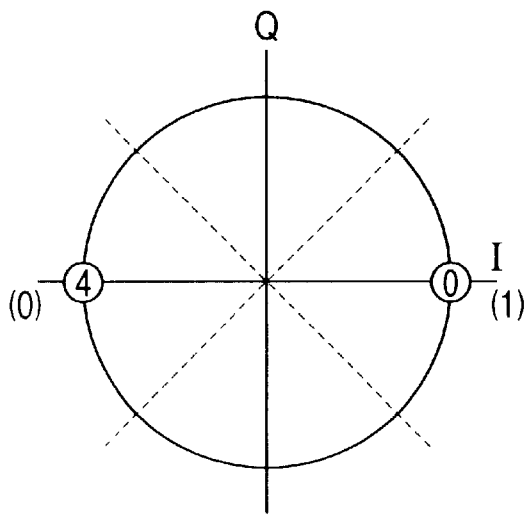

Here, the mapping for each modulation system on the transmitting side will be explained by using FIGS. 5(*a*)–5(*c*). FIG. 5(*a*) shows positioning of signal points when 8PSK is used as the modulation system. The 8PSK modulation system can transmit a 3-bit digital signal (a, b, c) in the form of with one symbol and there are 8 combinations of bits forming one symbol; (0,0,0), (0,0,1), to (1,1,1). These 3-bit digital signals are converted to signal point positioning 0 to 7 on the I-Q vector plane on the transmitting side in FIG. 5(*a*) and this conversion is called "8PSK mapping".

The example shown in FIG. 5(*a*) converts bit string (0,0,0) to signal point positioning "0"; bit string (0,0,1) to signal point positioning "1"; bit string (0,1,1) to signal point positioning "2"; bit string (0,1,0) to signal point positioning "3"; bit string (1,0,0) to signal point positioning "4"; bit string (1,0,1) to signal point positioning "5"; bit string (1,1,1) to signal point positioning "6"; bit string (1,1,0) to signal point positioning "7".

Likewise, FIG. 5(*b*) shows positioning of signal points when QPSK is used as the modulation system. According to the QPSK modulation system, 2-bit digital signals (d,e) can be transmitted in the form of one symbol and there are 4 combinations of bits forming one symbol; (0,0), (0,1), (1,0), (1,1). The example in FIG. 5(*b*) converts, for example, bit string (1,1) to signal point positioning "1"; bit string (0,1) to signal point positioning "3"; bit string (0,0) to signal point positioning "5"; bit string (1,0) to signal point positioning "7". The relationship between signal point positioning and position number of each modulation system is based on 8PSK and the same relationship between signal point positioning and position number is set.

Likewise, FIG. 5(*c*) shows signal point positioning when BPSK is used as the modulation system. According to the BPSK modulation system, a 1-bit digital signal (f) is transmitted in the from of one symbol. Digital signal (f) converts, for example, (1) to signal point positioning "0" and (0) to signal point positioning "4". Furthermore, energy of a burst symbol signal is diffused by a PN signal set for every frame at BPSK signal point positioning.

Then, the frame synchronization pattern will be explained. According to the hierarchical transmission system, a frame synchronization pattern is BPSK-modulated with the lowest necessary C/N and transmitted. The frame synchronization pattern uses predetermined 20 bits of the 32 bits. If the bit stream with a frame synchronization pattern consisting of 32 symbols is (S0, S1, . . . , S18, S19) and these are sequentially sent starting with S0, then (1,1,1,0,1,1,0,0, 1,1,0,1,0,0,1,0,1,0,0,0,) is sent for every frame. Hereafter, the bit stream with a frame synchronization pattern is also described as "SYNCPAT". This bit stream is converted to signal point positioning "0" or "4" by the BPSK mapping shown in FIG. 5(*c*) on the transmitting side and the converted symbol stream is transmitted.

Figure 6A:
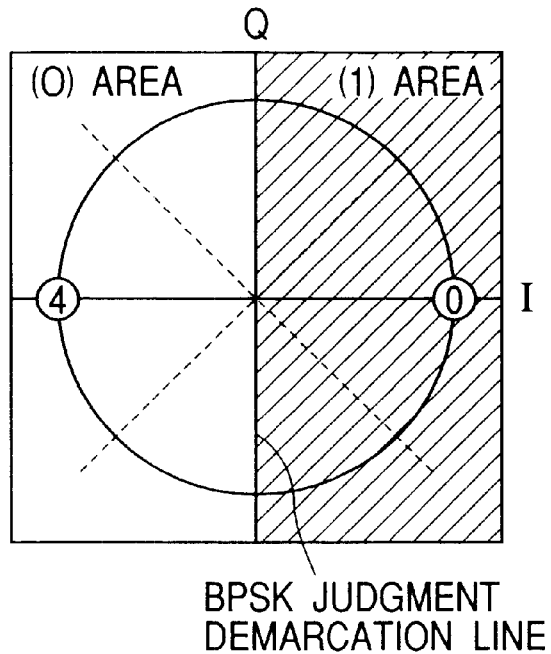
FIGS. 6(a) and 6(b) are a schematic diagram showing a BPSK demapping according to the embodiment of the present invention.

In order to acquire the frame synchronization pattern with 20 symbols, which are BPSK-modulated and transmitted, it is necessary to convert reception symbols to bits by the BPSK demapping shown in FIG. 6(*a*) as opposed to the mapping converted on the transmitting side. Therefore, as shown in FIG. 6(*a*), it is determined as "1" when the demodulated signal is received in the hatched area on the I-Q vector plane on a receiving side and "0" when the demodulated signal is received in the non-hatched area. That is, in FIG. 6(*a*), the output is designated as either "1" or "0", depending on which of the two areas divided by the BPSK judgment demarcation line the demodulated signal is received and this is called "BPSK demapping" and "demapper" in this description refers to a demapping circuit.

Baseband signals I and Q are input to the BPSK demapper 3 to perform the aforementioned bit conversion and bit stream B0, which has been BPSK-demapped by the BPSK demapper 3 is output. Bit stream B0 is input to the synchronization detection circuit 40 and bit streams with a frame synchronization pattern are acquired from the bit stream B0 in the synchronization detection circuit 40.

Figure 7:
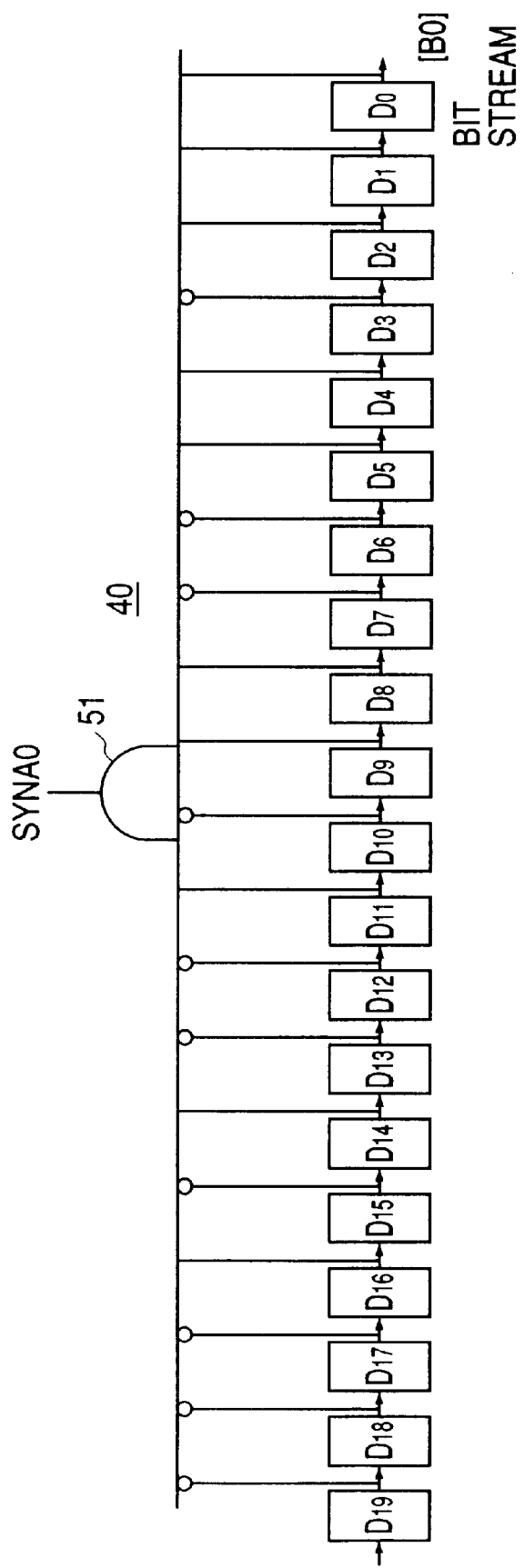
FIG. 7 is a block diagram showing a configuration of a synchronization detection circuit in the synchronization acquiring circuit according to the embodiment of the present invention.

Then, the synchronization detection circuit 40 is explained by using FIG. 7. The bit stream B0 is input to a shift register D19 and shifted successively up to the shift register D0 and at the same time the outputs of shift registers D19 to D0 are logically inverted for a predetermined bit, and then input to an AND gate 51. With the AND gate 51, if the states of the shift registers D19 to D0 (D0, D1, ..., D18, D19) become (1,1,1,0,1,1,0,0,1,1,0,1,0,0,1,0,1,0,0,0,), the output SYNAO of the AND gate 51 becomes high potential. That is, when SYNCPAT is acquired, SYNAO becomes high potential.

Output SYNAO of the synchronization detection circuit 40 is input to the frame synchronizing circuit 5 and when the frame synchronizing circuit 5 confirms that these inputs are repeatedly received at a certain frame interval as will be described later, frame synchronization is regarded as established and the frame synchronization is detected for every frame period.

Normally, according to the hierarchical transmission system in which a plurality of modulation systems with different necessary C/N are combined each time and repeatedly transmitted for each frame, TMCC patterns which are the transmission multiplexing configuration identification data indicating those multiplexing configurations are multiplexed as described above and after the frame synchronization is determined as established, TMCC patterns indicating a multiplexing configuration are extracted by a timing signal generated by a frame synchronization pulse. As a result, processing according to different modulation systems is not possible until the frame multiplexing configuration is known.

In other words, the demodulation circuit 1 operates as an 8PSK demodulation circuit until it is determined as frame synchronization, and therefore depending on the phase condition of the demodulation carrier reproduced by the carrier reproducing circuit in the demodulation circuit 1, the phases of the I axis and Q axis on the I-Q vector plane on the receiving side are rotated by θ=45°×n (n=integer 0 to 7) compared to those on the transmitting side. That is, the symbol stream of the frame synchronization pattern BPSK-mapped to signal point positioning "0" for bit "1" and to signal point positioning "4" for bit "0" in FIG. 5(c), depending on the phase condition of the reproduced demodulation carrier, may appear at signal point positioning "0" and "4" with θ=0° as in the case of the transmitting side, or may appear at signal point positioning "1" and "5" with θ=45° phase rotation, or may appear at signal point positioning "2" and "6" with θ=90° phase rotation, and so on, and there are eight kinds of phase in which a frame synchronization pattern is demodulated. Thus, any frame synchronization pattern must be allowed to be detected no matter in what phase the frame synchronization pattern is demodulated.

Figure 8:
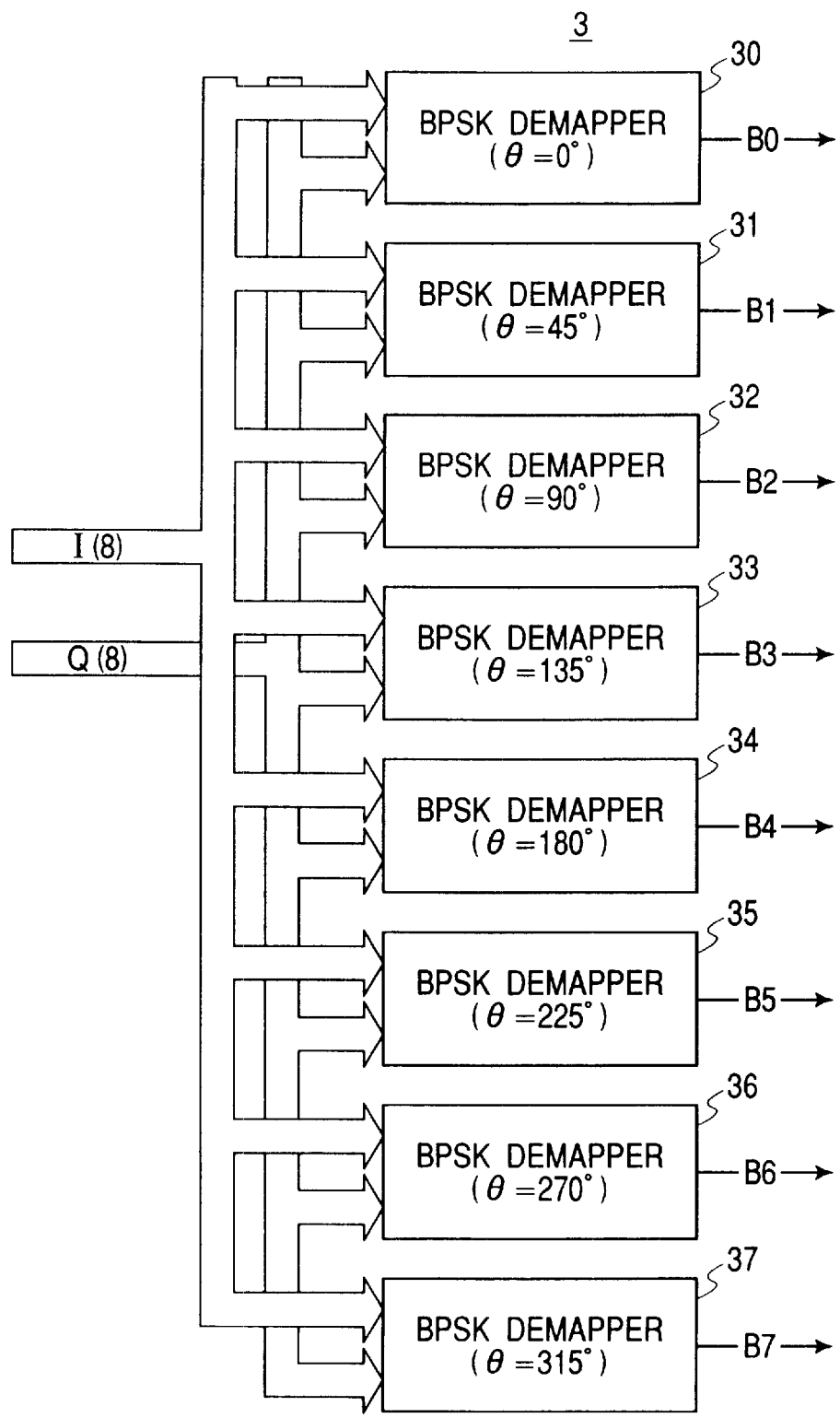
FIG. 8 is a schematic diagram showing a configuration of a BPSK demapper in the synchronization acquiring circuit according to the embodiment of the present invention.

Therefore, the BPSK demapper 3 is configured from BPSK demappers 30 to 37 corresponding to phase rotation of θ=0° (n=0), θ=45° (n=1), θ=90° (n=2), ..., θ=270° (n=6), θ=315° (n=7) as shown in FIG. 8.

Figure 6B:
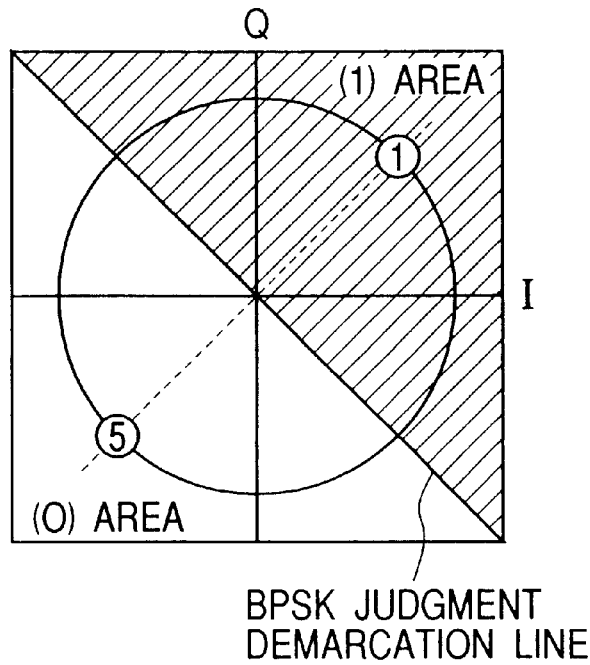

FIG. 6(b) shows a BPSK demapping corresponding to a case where the symbol stream of the demodulated frame synchronization pattern rotates the phase by θ=45° and bit "1", appears at signal point positioning "1" and bit "0", appears at signal point positioning "5". The BPSK judgment demarcation line shown by a bold line in FIG. 6(b) rotates 45° counterclockwise with respect to the BPSK judgment demarcation line shown by a bold line of the BPSK demapping in FIG. 6(a). By using such a BPSK demapper, a frame synchronization pattern can be stably acquired with θ=45° phase rotation. This output of the BPSK demapper 3 is output B1 of the BPSK demapper 3 shown in FIG. 1. B2 to B7 below are the outputs of the BPSK demapper 3 when θ=45°×n (n=an integer 2 to 7).

The circuit configuration of synchronization detection circuits 41 to 47 is the same as that of the synchronization detection circuits 40. Thus, the provision of the synchronization detection circuits 40 to 47 allows at least one of the synchronization detection circuits 40 to 47 to detect a frame synchronization pattern irrespective of phase rotation of a baseband signal according to the phase condition of the demodulated carrier reproduced by a carrier reproducing circuit in the demodulation circuit 1, and send SYNAn (n=an integer 0 to 7) according to the detected frame synchronization pattern (SYNCPAT) from the synchronization detection circuit in which the frame synchronization pattern has been detected.

Figure 9:
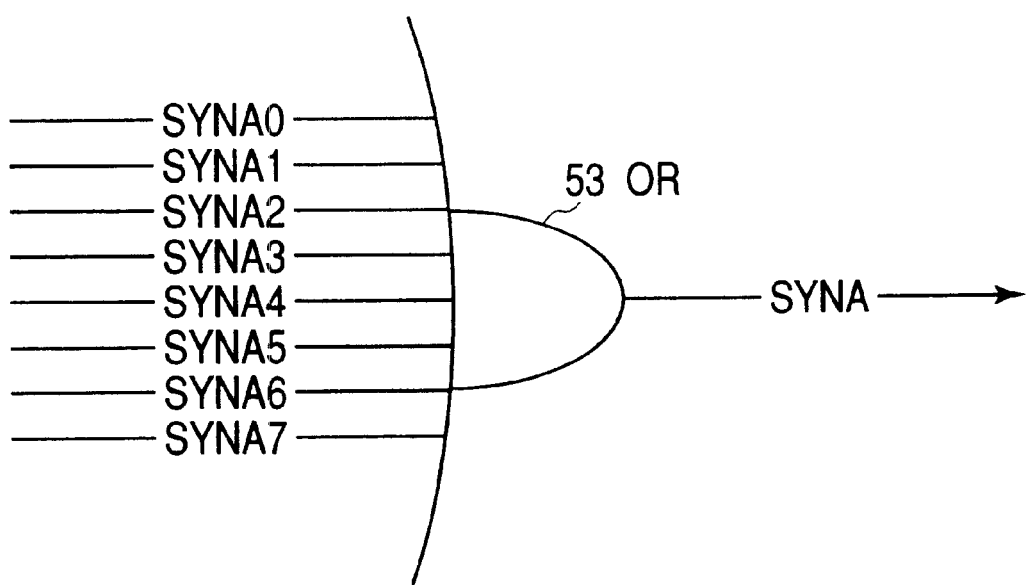
FIG. 9 is a block diagram showing a partial configuration of a frame synchronization circuit in the synchronization acquiring circuit according to the embodiment of the present invention.

Frame synchronization is regarded as established when it is confirmed that in an OR gate 530R provided for the frame synchronizing circuit 5 shown in FIG. 9, upon reception of the SYNAn signal, SYNA, logical sum output of SYNAn is received consecutively at a certain frame interval as described later and the frame synchronization detection is performed for every frame period.

The process until a frame synchronization pattern is detected by the frame synchronization detection circuit 2 shown in FIG. 1 has been explained so far. Then, absolute phase conversion, which refers to the process of coinciding the reception signal phase angle with the transmission signal phase angle by obtaining the current reception signal phase rotation angle from the signal point positioning of the detected frame synchronization pattern and then performing inverse phase rotation on the demodulated baseband signal based on the phase rotation angle obtained, will be explained.

The symbol stream with a frame synchronization pattern transmitted with BPSK-mapped on the transmitting side and 10 demodulated to a baseband signal by the demodulation circuit 1 is demapped from bit "1" or "0" by the BPSK demapper 3. The phase difference of the symbol stream of their respective frame synchronization signals demapped from this bit "1" or "0" is 180°. Then, all symbol streams to be demapped from bit "1" are obtained by rotating the phase of the symbol streams with a frame synchronization pattern demapped from bit "0" by 180°.

Furthermore, the reception signal point positioning corresponding to BPSK bit "1" is obtained by finding an average value of all symbol streams to be demapped from bit "1". Therefore, it is possible to convert the phase of the baseband signal to an absolute phase by finding a phase difference between the reception signal point corresponding to bit "1" of the BPSK obtained and signal point positioning "0", mapped onto bit "1" on the transmitting side, designating this as reception signal phase rotation angle θ and applying inverse phase rotation to the entire demodulated baseband signal.

The synchronization acquiring circuit according to the embodiment of the present invention will be again explained with reference to FIG. 2. The bit stream of the reproduction frame synchronization pattern transmitted from a frame synchronization pattern generating circuit 53 of the frame synchronizing circuit 5 and formed in the same pattern as the frame synchronization pattern on a transmitting side and a frame synchronization pattern interval signal are supplied to delay circuits 61 and 62, a frame synchronization pattern symbol stream is extracted based on the frame synchronization pattern interval signal from demodulated baseband signals I(8) and Q(8), the extracted frame synchronization pattern is delayed by the delay circuits 61 and 62 so that the extracted frame synchronization pattern coincides with the supply timing of the bit stream of the aforementioned reproduction frame synchronization pattern at the input end of a 0°/180° phase rotation circuit 63.

The bit stream of the aforementioned reproduction frame synchronization pattern transmitted from the frame synchronizing circuit 5 is also supplied to the 0°/180° phase rotation circuit 63. Based on bit "0" or "1" in the bit stream of the reproduction frame synchronization pattern, if the bit is "0", the 0°/180° phase rotation circuit 63 rotates the phase of the frame synchronization pattern bit extracted from demodulated baseband signals I(8) and Q(8) by 180° and outputs the result to a cumulative addition/averaging circuit 65 and if the bit is "1", the 0°/180° phase rotation circuit 63 outputs the frame synchronization pattern bit extracted from demodulated baseband signals I(8) and Q(8) to a cumulative addition/averaging circuit 66 without phase rotation.

Figure 10A:
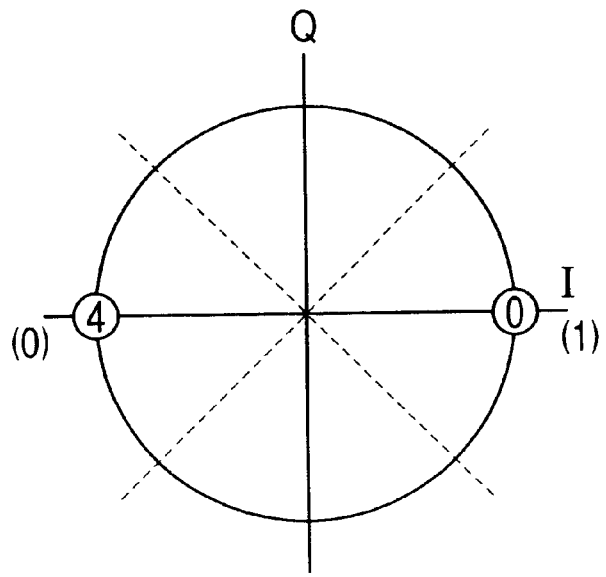
FIGS. 10(a) and 10 (b) are a schematic diagram to explain signal point positioning of a frame synchronization pattern according to the embodiment of the present invention.
Figure 10B:
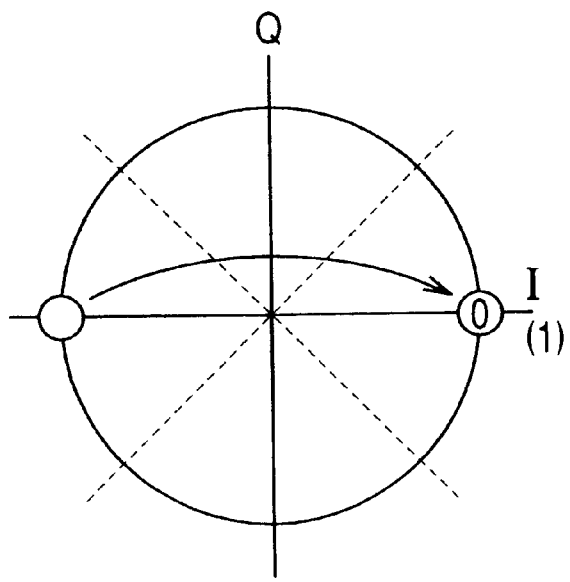

FIG. 10(*a*) shows the positioning of signal points of the frame synchronization pattern when a signal is received at reception signal phase rotation angle θ=0° and FIG. 10(*b*) shows the positioning of signal points of symbol streams VI(8) and VQ(8) after being converted by the 0°/180° phase rotation circuit 63. Symbol streams VI(8) and VQ(8) are each sent to the cumulative addition/averaging circuits 65 and 66, and added/averaged by the cumulative addition/averaging circuits 65 and 66 during a predetermined interval, and symbol streams AVI(8) and AVQ(8) added/averaged at predetermined intervals are output. Here, symbol streams VI(8) and VQ(8) are added/averaged in order to stably find the positioning of signal points even if a micro phase variation or amplitude variation of the reception baseband signal occurs due to deterioration of the reception C/N.

The cumulative addition/averaging circuits 65 and 66 determine reception signal points [AVI(8), AVQ(8)] of the signals BPSK-mapped onto bit "1". Then, its reception signal point [AVI(8), AVQ(8)] is input to a reception signal phase determining circuit 67 made up of ROM and 3-bit phase rotation signal RT(3) corresponding to the phase rotation angle is obtained from the reception signal phase determination table shown in FIG. 11.

Figure 11:
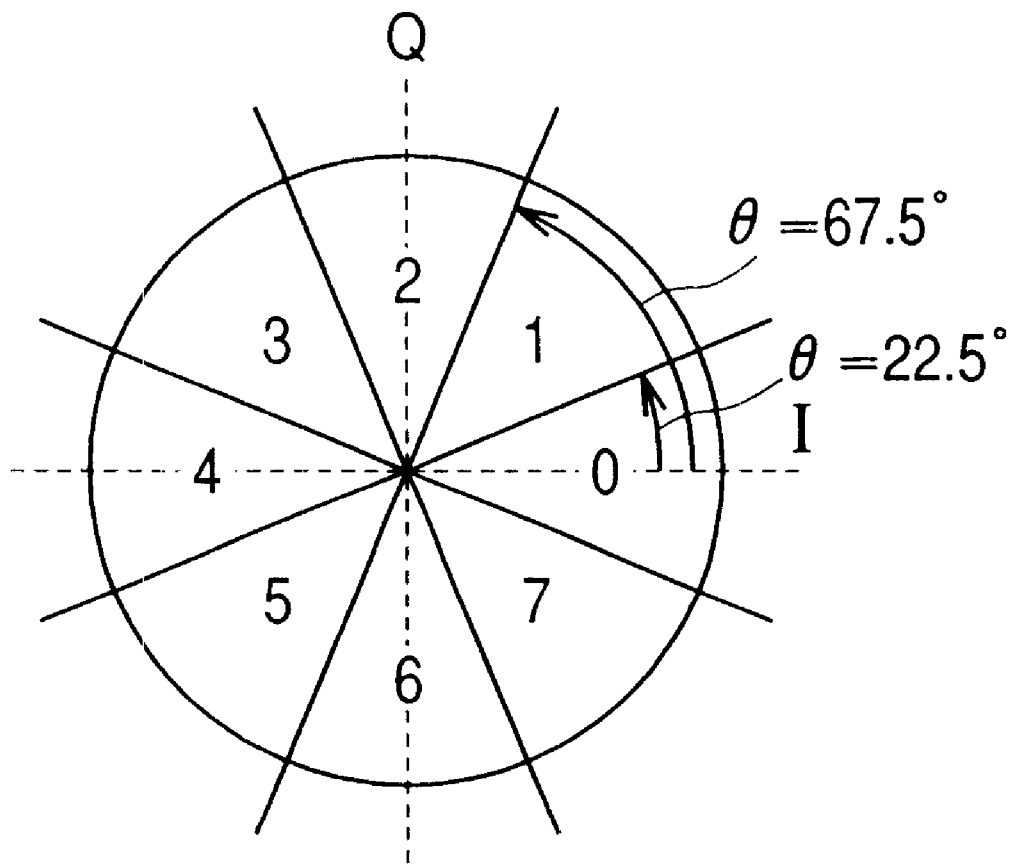
FIG. 11 is a schematic diagram to explain a reception signal phase determination table according to the embodiment of the present invention.

"0" to "7" in FIG. 11 denote a decimal notation based on a phase rotation signal RT(3). For example, when reception signal phase rotation angle θ=0° in FIG. 10(*a*), the phase rotation signal of signal points AVI(8) and AVQ(8) determined from the reception signal phase determination table is "0". Therefore, (0,0,0) is sent to the phase rotation signal RT(3). When the reception signal phase rotation angle θ=45°, the phase rotation signal RT(3) is likewise "1", and therefore (0,0,1) is sent to the phase rotation signal RT(3).

The remapper 7 made up of ROM receives this phase rotation signal RT(3) and converts its phase to an absolute phase by rotating the phase of baseband signals I(8) and Q(8) demodulated by the demodulation circuit 1 according to phase rotation signal RT(3).

Furthermore, the action of the remapper 7 will be explained. The remapper 7 configures a phase conversion circuit to equalize the positioning of the signal point of the baseband signal demodulated by the demodulation circuit 1 with that on the transmitting side. In the reception signal phase detection circuit 6, the reception signal phase rotation angle θ is calculated and the phase rotation signal RT(3) corresponding to the reception signal phase rotation angle θ is supplied to the remapper 7. Here, the phase rotation signal RT(3) is an integer 0 to 7, and its relationship with the phase rotation angle θ is defined as shown in expression (1) below:

$$RT(3)=\theta/45 \quad (1)$$

where θ=n·45° and n is an integer 0 to 7.

The absolute phase of the baseband signal is obtained by inversely rotating the phase, that is, rotating by (−θ) for phase rotation angle θ. Therefore, the remapper 7 rotates the phase of input baseband signals I and Q by angle φ (=−θ) according to expressions (2) and (3) below and outputs baseband signals I'(8) and Q'(8) converted to absolute phases (hereafter, the number of bits is also abbreviated as I' and Q').

$$I'=I\cos(\phi)-Q\sin(\phi) \quad (2)$$

$$Q'=I\sin(\phi)+Q\cos(\phi) \quad (3)$$

Baseband signals I'(8) and Q'(8) output from the remapper 7 are supplied to a distribution vector calculating circuit 81 to which a TMCC interval signal output from the frame synchronizing circuit 5 is input and distribution values of the positioning of signal points of baseband signal I'(8) and Q'(8) are obtained in TMCC interval. The positioning of signal points of baseband signal I'(8) and Q'(8) during a TMCC pattern interval generally varies based on the phase condition of the demodulation carrier reproduced in the demodulation circuit 1 and noise in a transmission path.

That is, when the phase of the demodulation carrier changes, the signal point positioning of baseband signals I'(8) and Q'(8) moves along the circumference in FIG. 5(*c*) and furthermore the signal point positioning of baseband signals I'(8) and Q'(8) during the TMCC interval are scattered by centered on signal positions "0" and "1", reference positions shown in FIG. 5(*c*) based on noise on a transmission path. Therefore, the distribution vector calculating circuit 81 calculates a vector from a signal position, which is a reference position, to a signal point position of baseband signals I'(8) and Q'(8) during a TMCC interval as a distribution vector by using the signal position, which is the reference position, as an average value.

This distribution vector is supplied to a distribution judging circuit 82 and the distribution judging circuit 82 judges whether or not the probability that the signal position will be within a circle with a predetermined radius centered on the reference position signal point positioning is equal to or higher than a predetermined value or not and sends the result to the frame synchronizing circuit 5 as a distribution judgment result signal.

Here, the aforementioned radius is set so that the distribution vector is outside the circle when the C/N value is less than the required C/N value. For example, the required C/N value is set to 0 dB. Therefore, when the reception condition is C/N value≧0 dB, the distribution vector is within the circle with the aforementioned radius and when the reception condition is C/N value<0 dB, the distribution vector is outside the circle with the aforementioned radius. When the distribution vector is not inside the aforementioned circle, the reception condition is judged to be extremely bad or when no carrier is reproduced.

On the other hand, in the CNR determination circuit 9, baseband signals I(8) and Q(8) demodulated in the demodulation circuit 1 are also supplied to the signal point positioning conversion circuit 91 to substantially obtain a C/N, and signal point positioning data is obtained from baseband signals I(8) and Q(8) with reference to the signal point positioning conversion table in the signal point positioning conversion circuit 91. The signal point positioning data obtained is supplied to the distribution value calculating circuit 92 to find a distribution value of the signal point positioning data.

Then, the signal point positioning conversion table is explained. In case of QPSK modulation, the reference positions of a reception signal (I,Q) are (0,0), (0,1), (1,1) and (1,0), and (0,0) corresponds to the first quadrant; (0,1), the second quadrant; (1,1), the third quadrant; and (1,0), the fourth quadrant. (0,1), (1,1) and (1,0) are gathered together in the first quadrant by rotating them by 90 degrees clockwise, 180 degrees clockwise and 90 degrees counterclockwise, respectively. The reception signals (DI, DQ) gathered in the first quadrant are converted to signal point positioning data. The same applies to 8PSK modulation and reception signals in other quadrants are gathered in a predetermined quadrant and then converted to signal point positioning data.

From the signal point positioning data obtained by the signal point positioning conversion circuit 91, a distribution value of the signal point positioning data is obtained by the distribution value calculating circuit 92 and the distribution value obtained is compared with a predetermined reference value A, the number of times a distribution value equal to or higher than reference value A occurs during a predetermined unit period is calculated and a total sum DSMS of the number of times a distribution value equal to or higher than reference value A occurs within the aforementioned unit period is obtained. This value of total sum DSMS denotes the frequency a distribution value becomes equal to or higher than the reference value A during the aforementioned unit period.

Figure 12:
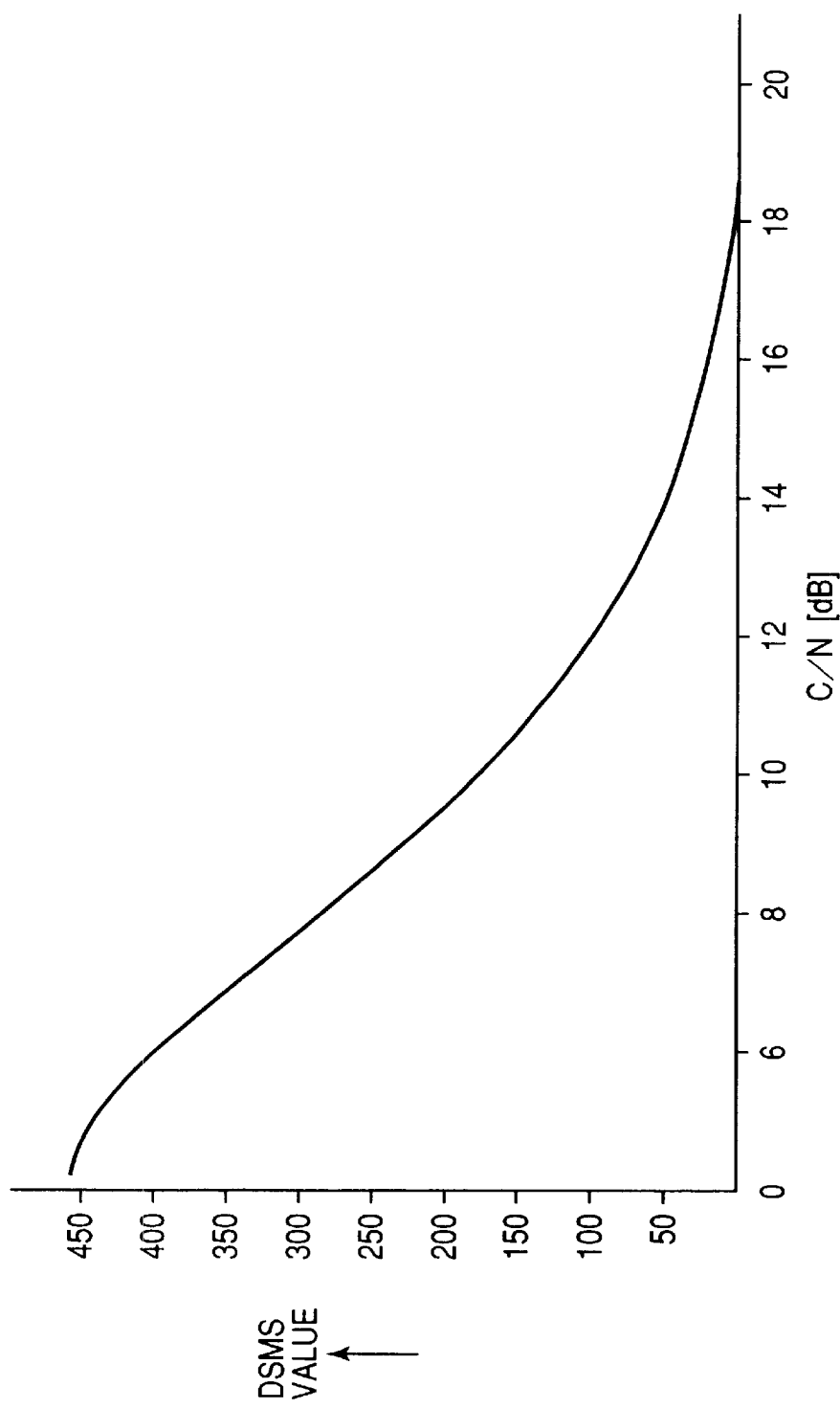
FIG. 12 is a characteristic diagram to explain the action of a CNR determining circuit in the synchronization acquiring circuit according to the embodiment of the present invention.

The value of total sum DSMS obtained from a distribution value calculating circuit 92 is supplied to a CNR determining circuit 93. In the CNR determining circuit 93, a table of total sum DSMS vs. C/N values based on FIG. 12 obtained through experiments is stored beforehand. The C/N value corresponding to the total sum DSMS obtained by the distribution value calculating circuit 92 is read. The C/N value read from the CNR determining circuit 93 is supplied to conversion circuit 94 and the aforementioned correlation detection reference value is output from the conversion circuit 94 when a frame synchronization pattern is detected.

This correlation detection reference value is determined from the BER characteristic based on the C/N value and is set to such a value that makes it possible to detect and maintain synchronization. When the C/N value is small, the correlation reference value is set to a small value, and if the C/N value is 0 dB, for example, a 6-bit error, that is, the correlation detection reference value is set to 14 bits (the number of bits in the reception frame pattern that coincides with the frame synchronization pattern bit on the transmitting side).

Figure 4:
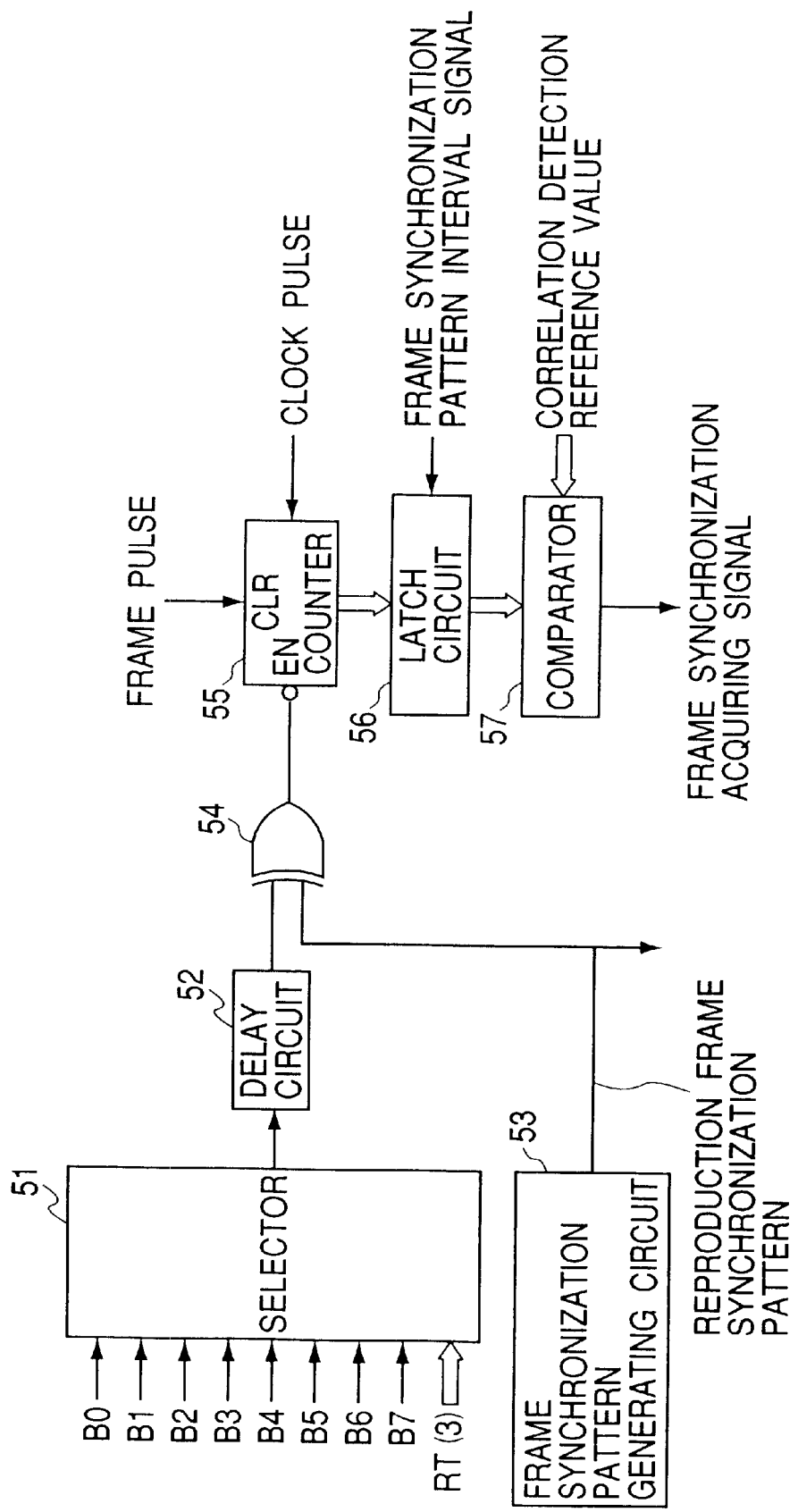
FIG. 4 is a block diagram showing a partial configuration of a frame synchronization circuit in the synchronization acquiring circuit according to the embodiment of the present invention.

As shown in FIG. 4, a frame synchronizing circuit 5 comprises a selector 51 that receives outputs B0 to B7 from a BPSK demapper 3 and a phase rotation signal RT(3) and that selects one of outputs B0 to B7 from the BPSK demapper 3 based on the phase rotation signal RT(3), the frame synchronization pattern generating circuit 53 that sends a bit stream with a reproduction frame synchronization pattern formed as the same pattern as the frame synchronization pattern on the transmitting side, the delay circuit 52 that delays the output from the selector 51 and coincides the timing of each bit of the output from the selector 51 with the timing of each bit of the reproduction frame synchronization pattern sent from frame synchronization pattern generating circuit 53, an exclusive-OR circuit 54 that receives each bit of the reproduction frame synchronization pattern and the output bit from the selector 51 output via a delay circuit 52 as inputs and detects coincidence between them, a counter 55 that counts clock pulses that synchronize with each bit of a frame synchronization pattern during the coincidence detection period from the exclusive-OR circuit 54 over a frame pulse period, a latch circuit 56 that latches the count value of the counter 55, and comparator 57 that compares the latch output of latch circuit 56 with the correlation detection reference value output from the conversion circuit 94 that will be described later and sends a frame synchronization pattern detection signal (frame synchronization acquiring signal).

In the frame synchronizing circuit 5 configured as shown above, one of outputs B0 to B7 from the BPSK demapper 3 is selected by the selector 51 based on the phase rotation signal RT(3). The timing of the selected output is matched with the timing for each bit of the reproduction frame synchronization pattern output from the frame synchronization pattern generating circuit 53 through a delay in the delay circuit 52 and is subjected to a logical sum operation by the exclusive-OR circuit 54. As a result, the counter 55 counts clock pulses from the exclusive-OR circuit 54 during a period of output from the selector 51 that matches for every bit of the bit streams of the reproduction frame synchronization pattern. Therefore, a count value that denotes the number of output bits from the selector 51 that matches each bit of the reproduction frame synchronization pattern during one frame period is latched from the counter 55 to the latch circuit 56. This latch output and correlation detection reference value are compared in a comparator 57 and if the latch output from the latch circuit 56 is equal to or larger than the correlation detection reference value, a frame synchronization pattern detection signal is sent and if it is smaller than the correlation detection reference value, a frame synchronization pattern detection signal is not sent.

Figure 13:
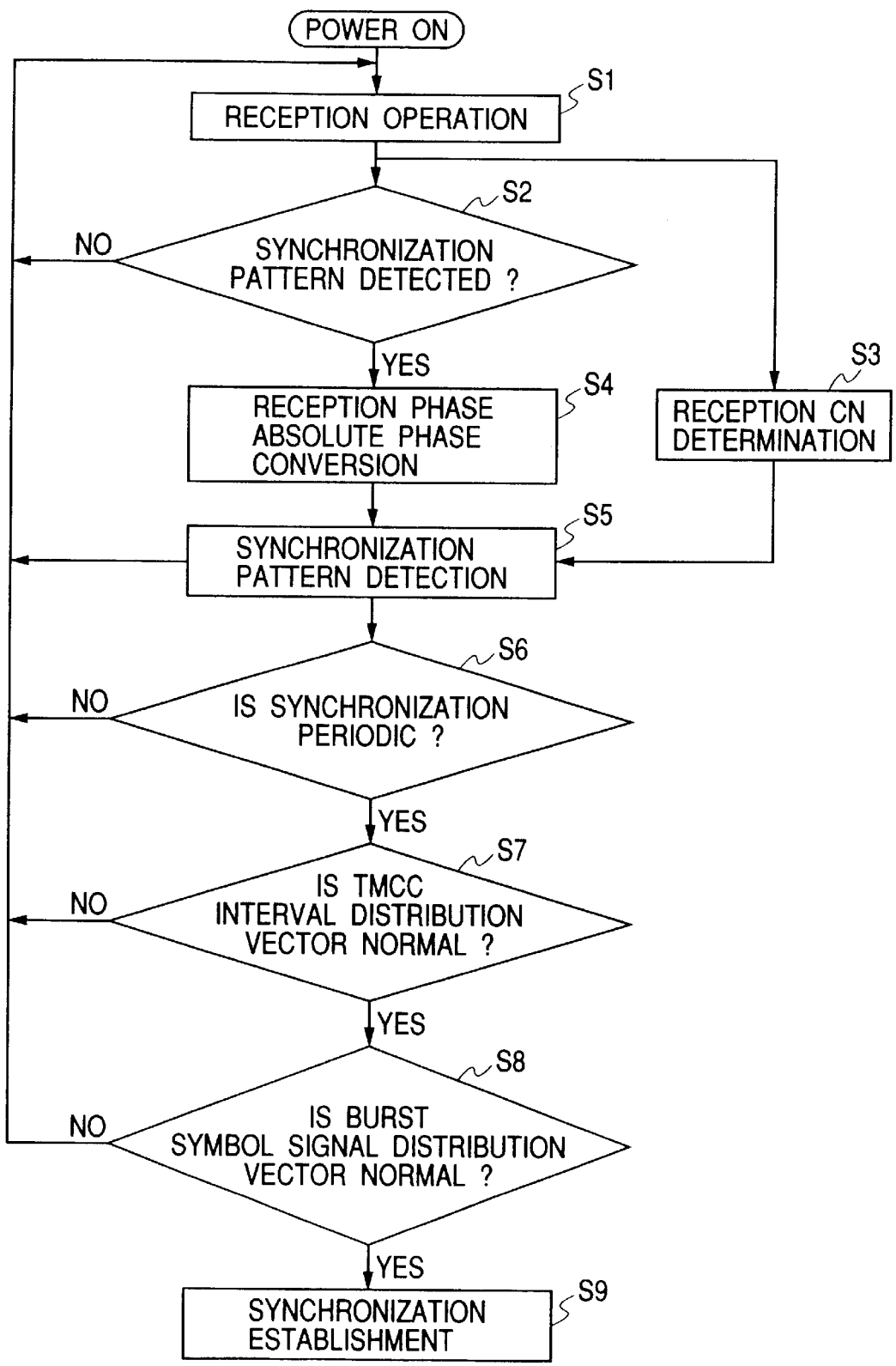
FIG. 13 is a flow chart to explain the action of the synchronization acquiring circuit according to the embodiment of the present invention.

Then, the action of the frame synchronizing circuit 5 after a frame synchronization pattern is detected until synchronization is judged as established is explained based on the flow chart shown in FIG. 13.

When the power is turned on, a reception operation is started (step S1), followed by a check as to whether a frame synchronization pattern is detected from one of SYNA0, the output of an AND gate 40 that receives the output of bit stream B0, and SYNA1 to SYNA7, the outputs of the AND gate that receives the output of bit streams B1 to B7 likewise (step S2). The check in step S2 is performed by checking the output of the OR gate 530R. When the received frame synchronization pattern is detected, a high potential output is sent from the OR gate 530R. Here, when detection in step S2 is performed twice consecutively, a frame synchronization pattern can be regarded as detected. In step S2, if a frame synchronization pattern is not regarded as detected, the procedure is repeated from step S1.

If a frame synchronization pattern is regarded as detected in step S2, the reception phase of the frame synchronization pattern is converted to an absolute phase in which the frame synchronization pattern is obtained from the selector 51 by selecting one of bit streams B0 to B7 output from the BPSK demapper 3 according to phase rotation signal RT(3) (step S4). On the other hand, demodulation is performed in the demodulation circuit 1 and CNR determination is performed from a distribution value obtained based on the signal point positioning and a correlation detection reference value based on the C/N value is obtained (step S3).

Following step S4, a frame synchronization pattern is detected (step S5). The timing of the frame synchronization pattern detected in step S5 is matched with the timing of the reproduction frame synchronization pattern with the same pattern as the frame synchronization pattern on the transmitting side and an exclusive-OR operation is performed by the exclusive-OR circuit 54. Through this match detection, the counter 55 counts the number of bits in which the detected frame synchronization pattern matches with the reproduction frame synchronization pattern with the same pattern as the frame synchronization pattern on the transmitting side. If this count value is equal to or larger than the correlation detection reference value, frame synchronization pattern is regarded as detected. Frame synchronization pattern is detected by checking the output of the comparator 57.

In step S5, when there are bits whose detected frame synchronization pattern does not coincide with the reproduction frame synchronization pattern, if mismatched bits are numerous and the number of matched bits are smaller than the correlation detection reference value, the frame synchronization pattern is regarded as undetected and the procedure is repeated from step S1 once again (step S5).

If in step S5 the frame synchronization pattern is judged as detected, a check is performed as to whether a frame synchronization pattern is detected periodically, that is, whether a frame synchronization pattern with fewer bit errors exceeding the correlation reference value is detected or not for every one frame period (step S6). If in step S6 the frame synchronization pattern is judged as undetected periodically, the procedure is repeated from step S1 once again after step 6.

If in step S6 the frame synchronization pattern is judged as detected periodically, a check is performed as to whether distribution of a distribution vector during a TMCC interval is normal or not after step S6. That is, the distribution judgment result signal of the distribution judging circuit 82 is checked (step S7). When the result of the step S7 check shows that the distribution judgment result signal is an abnormal signal, that is, when the probability that the signal point positioning will be outside the predetermined circle is equal to or larger than a predetermined value, the procedure is repeated from step SI once again.

If the distribution judgment result signal of the distribution judging circuit 82 shows that the distribution judgment result signal is a normal signal, that is, when the probability that the signal point positioning will be outside the predetermined circle is smaller than a predetermined value (the probability that the signal point positioning will exist inside the predetermined circle is large), a check is performed after step S7 as to whether the distribution vector of the burst symbol signal is normal or not, that is, the judgment result signal output from a burst symbol signal error measurement/judgment circuit 10 is checked (step S8). If the check result in step S8 shows that the burst symbol signal error measurement/judgment circuit 10 outputs a judgment result signal that the distribution vector of the burst symbol signal is not normal, the procedure is repeated from step SI once again after step S8.

If the check result in step S8 shows that the burst symbol signal error measurement/judgment circuit 10 outputs a judgment result signal that the distribution vector of the burst symbol signal is normal, synchronization is regarded as established and a synchronization establishment signal is output.

As explained above, in the synchronization circuit according to the embodiment of the present invention, when a reception frame synchronization pattern is detected, a frame synchronization pattern is regarded as detected when the number of detected reception frame synchronization signal bits coinciding with frame synchronization pattern bits on the transmitting side is equal to or larger than the correlation reference value based on the C/N value on a transmission path, and synchronization is regarded as established when the corresponding frame synchronization pattern is detected for every frame period, a distribution vector is normal during a TMCC interval, a distribution vector during a TMCC interval is normal and a distribution vector of the burst symbol signal is normal, which makes it possible to stably acquire synchronization even when the C/N value of the transmission path is low.

One embodiment of the synchronization circuit of the present invention illustrated the case where synchronization is regarded as established when both step S7 and step S8 are satisfied as an example, but it is also possible to judge that synchronization is established when a distribution vector during a TMCC interval is judged as normal in step S7 omitting step S8, that is, when the distribution judgment result signal of the distribution judging circuit 82 is a normal signal. It is also possible to judge that synchronization is established when step S7 is omitted and step S8 after step 6 is executed and the checking result in step S8 shows that a distribution vector of the burst symbol signal is normal.

INDUSTRIAL APPLICABILITY

As explained above, the synchronization acquiring circuit according to the present invention provides an advantage that frame synchronization can be stably acquired, detected and maintained without pseudo-synchronization lock during frame synchronization acquisition.

What is claimed:

1. A synchronization acquiring circuit, comprising:

synchronization detecting means for detecting a reception frame synchronization pattern from a demodulated baseband signal;

C/N determining means for determining a C/N value of a transmission path from the demodulated baseband signal;

correlation detection reference value calculating means for outputting as a correlation detection reference value; the number of bits in a reception frame synchronization pattern that coincides with the bits of the frame synchronization pattern on a transmitting side that allows synchronization to be detected and maintained based on the determined C/N value;

coincided bit number calculating means for comparing the bits of the reception frame synchronization pattern detected by the synchronization detecting means with the bits of frame synchronization pattern on the transmitting side and for calculating the number of coincided bits;

comparing means for outputting said frame synchronization pattern detection signal when the number of bits calculated by the coincided bit number calculating means is equal to or larger than a correlation detection reference value;

first detecting means for detecting that the frame synchronization pattern detecting signal is output by the comparing means for every 1-frame period; and second detecting means for detecting that a signal, which is received by using a part of a predetermined modulated wave of modulated waves used in a transmission signal, has a quality equal to or higher than a predetermined quality depending on whether the probability that a distribution value of the signal point positioning of the signal received will be within a predetermined range is equal to or higher than a predetermined probability, wherein synchronization is regarded as established when the first detecting means detects a frame synchronization and the second detecting means detects that the reception signal has the quality equal to or higher than the predetermined quality.

2. The synchronization acquiring circuit according to claim 1, wherein the synchronization detecting means determines synchronization pattern detection when a reception frame synchronization pattern from the demodulated baseband signal is detected at least one time consecutively for a predetermined period.

3. The synchronization acquiring circuit according to claim 1, wherein the C/N determining means further comprises:
   a signal point positioning/conversion circuit that converts a demodulated baseband signal to signal point positioning;
   a distribution value calculating circuit that calculates a distribution value at a signal position converted by the signal point positioning/conversion circuit and calculates the occurring number of times of distribution values equal to or larger than a predetermined reference value;
   a CNR determining circuit that determines a C/N value based on the occurring number of times of distribution values obtained by the distribution calculating circuit; and
   a conversion circuit that converts the C/N value obtained by the CNR determining circuit to a correlation detection reference value.

4. The synchronization acquiring circuit according to claim 1, wherein the predetermined modulated wave is either the modulated wave with the least number of levels or the modulated wave to identify the transmission multiplexing configuration.

5. The synchronization acquiring circuit according to claim 1, wherein the predetermined modulated wave is a modulated signal with the least number of levels and the modulated wave to identify the transmission multiplexing configuration.

6. The synchronization acquiring circuit according to claim 1, wherein the second detecting means further comprises at least one of:
   detecting means for detecting that the predetermined modulated wave of the modulated waves used in the transmission signal is the modulated wave with the least number of levels and the probability that a distribution value of signal point positioning of the demodulated baseband signal will be within a predetermined range is equal to or higher than a predetermined probability, and
   detecting means for detecting a bit error rate relating to a part of the modulated wave in which a modulation signal is known in particular, the modulated wave being witht eh least number of singal levels among the modulated waves used in the transmission signal, and for detecting that the detection bit error rate is equal to or lower than a certain reference value.

7. The synchronization acquiring circuit according to claim 1, wherein the second detecting means further comprises absolute phase converting means for matching the phase rotation angle of the demodulated baseband signal with the phase rotation angle of the transmission signal, and detects that the probability that a distribution value of the signal point positioning from the demodulated baseband signal with the absolute phase will be within a predetermined range is equal to or higher than a predetermined probability.

* * * * *